US012540952B2

(12) United States Patent
Gattere et al.

(10) Patent No.: US 12,540,952 B2
(45) Date of Patent: Feb. 3, 2026

(54) MICROELECTROMECHANICAL SENSOR DEVICE WITH ACTIVE OFFSET COMPENSATION

(71) Applicant: STMICROELECTRONICS S.r.l., Agrate Brianza (IT)

(72) Inventors: Gabriele Gattere, Castronno (IT); Jean Marie Darmanin, Marsaxlokk (MT); Francesco Rizzini, Passirano (IT)

(73) Assignee: STMICROELECTRONICS S.r.l., Agrate Brianza (IT)

( * ) Notice: Subject to any disclaimer, the term of this patent is extended or adjusted under 35 U.S.C. 154(b) by 286 days.

(21) Appl. No.: 18/364,847

(22) Filed: Aug. 3, 2023

(65) Prior Publication Data

US 2024/0044932 A1 Feb. 8, 2024

(30) Foreign Application Priority Data

Aug. 8, 2022 (IT) .................. 102022000016986

(51) Int. Cl.
*G01P 15/125* (2006.01)
(52) U.S. Cl.
CPC ................ *G01P 15/125* (2013.01)
(58) Field of Classification Search
CPC ...................................... G01P 15/125
USPC ....................................... 73/514.32
See application file for complete search history.

(56) References Cited

U.S. PATENT DOCUMENTS

| 2008/0178671 | A1 | 7/2008 | Miller et al. |
| 2015/0022431 | A1 | 1/2015 | Mahameed et al. |
| 2016/0187371 | A1* | 6/2016 | Sakai ................ G01P 15/125 |
| | | | 73/514.32 |
| 2018/0038887 | A1 | 2/2018 | Zhang et al. |

FOREIGN PATENT DOCUMENTS

| DE | 102013111795 A1 * | 6/2014 | .......... B81B 3/001 |
| WO | WO-2014184033 A1 * | 11/2014 | .......... G01P 21/00 |

OTHER PUBLICATIONS

Hopf et al. Machine translation of WO 2014184033. Published Nov. 2014. Accessed Jul. 2025. (Year: 2014).*
Cazzaniga et al. Machine translation of DE 102013111795. Published Jun. 2014. Accessed Jul. 2025. (Year: 2014).*

* cited by examiner

*Primary Examiner* — Walter L Lindsay, Jr.
*Assistant Examiner* — Philip T Fadul
(74) *Attorney, Agent, or Firm* — Seed Intellectual Property Law Group LLP

(57) ABSTRACT

A microelectromechanical sensor device having a sensing structure with: a substrate; an inertial mass, suspended above the substrate and elastically coupled to a rotor anchoring structure by elastic coupling elements, to perform at least one inertial movement due to a quantity to be sensed; first sensing electrodes, integrally coupled to the inertial mass to be movable due to the inertial movement; and second sensing electrodes, fixed with respect to the quantity to be sensed, facing and capacitively coupled to the first sensing electrodes to form sensing capacitances having a value that is indicative of the quantity to be sensed. The second sensing electrodes are arranged in a suspended manner above the substrate and a compensation structure is configured to move the second sensing electrodes with respect to the first sensing electrodes and vary a facing distance thereof, in the (Continued)

absence of the quantity to be sensed, in order to compensate for a native offset of the sensing structure.

19 Claims, 4 Drawing Sheets

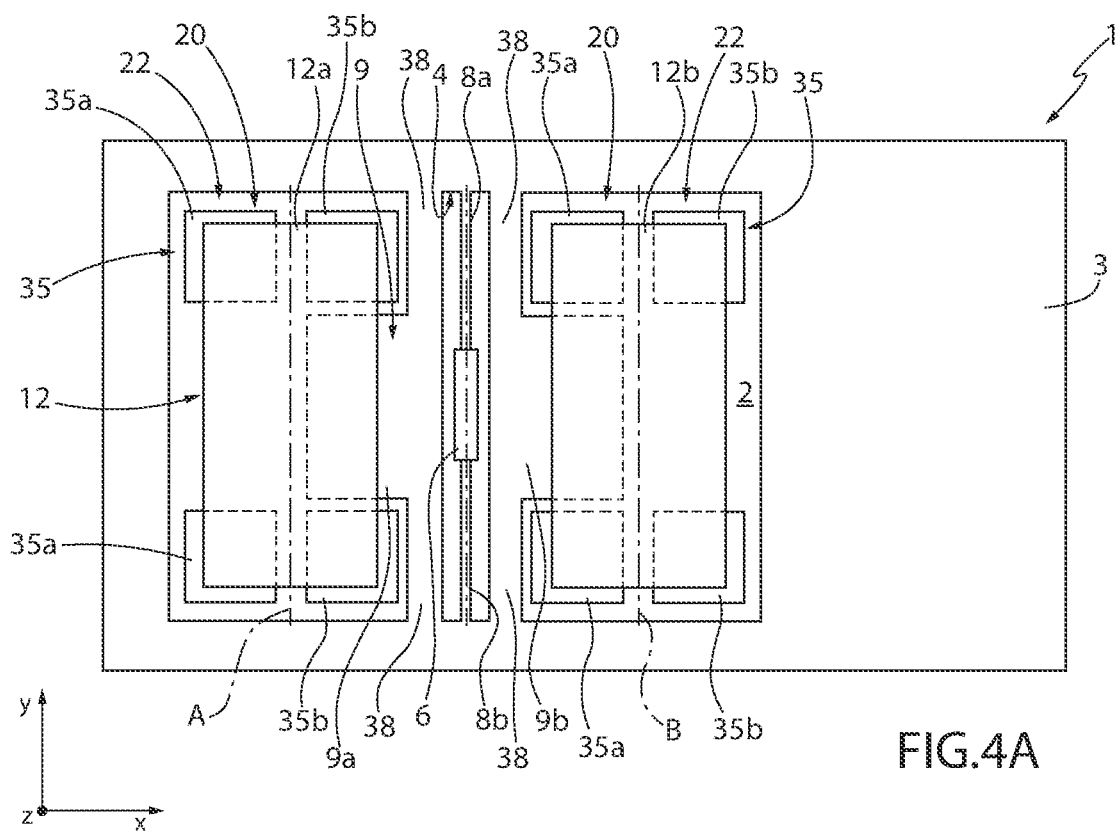
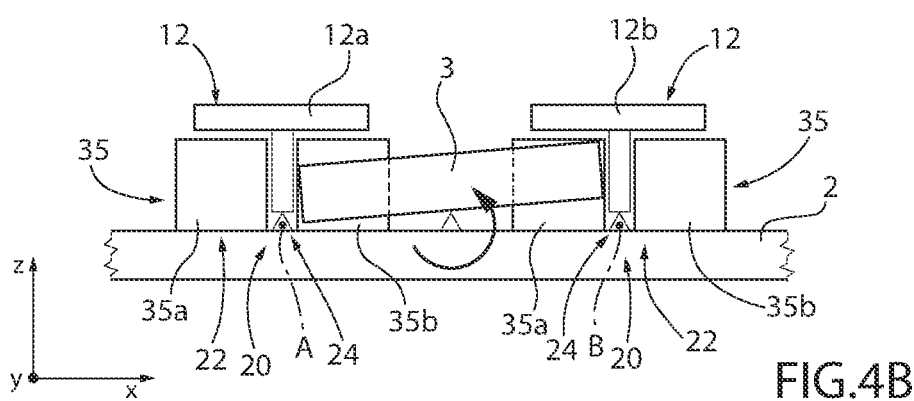

MICROELECTROMECHANICAL SENSOR DEVICE WITH ACTIVE OFFSET COMPENSATION

BACKGROUND

Technical Field

The present solution relates to a microelectromechanical sensor device (of the MEMS, Micro-Electro-Mechanical System, type), provided with an active offset compensation; the following discussion will make explicit reference, without however losing generality, to a MEMS sensor device implementing a capacitive accelerometer, for sensing at least one linear acceleration acting along at least one sensing axis.

Description of the Related Art

MEMS accelerometers are known having a sensing axis in the horizontal plane, i.e., including sensing structures sensitive to accelerations acting along at least one direction parallel to a corresponding plane of main extension and to a top surface of a corresponding substrate of semiconductor material; MEMS accelerometers are also known with vertical sensing axis, i.e., including sensing structures sensitive to accelerations acting along a direction orthogonal to the same plane of main extension.

In general, the sensing structure of a MEMS accelerometer comprises at least one mobile mass moving due to inertial effect, generally defined as "rotor mass" or simply "rotor" as it is movable due to the inertial effect (without this however implying for the same inertial mass to necessarily have a rotational movement) in the presence of an acceleration to be sensed, and mobile electrodes (or rotor electrodes) integrally coupled thereto.

The rotor mass is arranged suspended above a substrate, coupled to a corresponding rotor anchoring structure (integral with the same substrate) by means of coupling elastic elements, which allow its movement due to the inertial effect along one or more sensing directions.

The sensing structure of the MEMS accelerometer also comprises fixed or stator electrodes, integrally coupled to the substrate by respective stator anchors, capacitively coupled to the rotor electrodes to form sensing capacitors, having a sensing capacitance indicative of the quantity to be sensed.

Typically, the stator electrodes are divided into two groups, the electrodes of each group being biased to a different biasing voltage and being arranged facing respective rotor electrodes to have opposite variations of a facing distance (and, consequently, of a sensing capacitance) due to the inertial movement of the rotor mass, so as to implement a differential configuration.

The MEMS accelerometer also comprises an electronic circuit (so-called ASIC—Application Specific Integrated Circuit), electrically coupled to the sensing structure, which receives at input the capacitive variations produced by the sensing capacitors and processes them to determine the acceleration value, for generation of an output electrical signal (which may be provided externally to the MEMS accelerometer for further processing).

The aforementioned ASIC electronic circuit and the sensing structure are typically provided in respective dies of semiconductor material, which are enclosed within a housing, so-called package, which encloses and protects the same dies, also providing an electrical connection interface towards the outside; in so-called substrate-level package solutions, the package is formed by one or more base and cap layers, which are directly coupled to the dies of the MEMS device, forming their mechanical and electrical interfaces towards the external environment.

A known problem affecting the sensing structures of known MEMS accelerometers is represented by the so-called offset error, that is, by a non-zero value of the output signal in the absence of an acceleration to be sensed.

The offset error is due to the fact that the rotor mass and the associated rotor electrodes, in neutral or rest condition (i.e., in the aforementioned condition of absence-of-acceleration), are not centered (not equidistant) with respect to the stator electrodes; this error is therefore intrinsic to the manufacturing of the MEMS accelerometer sensing structure.

In particular, the offset of the rotor mass is typically due to a residual manufacturing stress affecting the material, typically polycrystalline silicon, forming the aforementioned coupling elastic elements that couple the rotor mass to the corresponding anchoring structure. The offset may be considered as a force acting on the coupling elastic elements, determining a deformation thereof that is present even in the aforementioned rest condition.

The offset generally creates a mismatch of the sensing capacitance (and sensitivity) values between the rotor electrodes and the stator electrodes of the two groups in the aforementioned differential configuration. As a result, an increase occurs in the non-linearity and the so-called VRE (Vibration Rectification Error) error (that is associated with the response of the accelerometer to AC vibrations which are rectified, showing up as an anomalous shift in the offset of the accelerometer).

In particular, the non-linear relationship between the capacitance and the displacement between the rotor and stator electrodes entails an asymmetry in the $\Delta C/\Delta g$ characteristic in the presence of an initial offset (where C represents the capacitance and g the acceleration); in other words, a positive displacement between the electrodes results, for example, in a greater capacitive variation with respect to a negative displacement.

Furthermore, a reduction of the full-scale value of the MEMS accelerometer occurs. In particular, the presence of an initial offset significantly reduces the full scale, by reducing the range of the displacement of the electrodes (before reaching corresponding stop elements, so-called stoppers).

High-end applications, such as for example structural analysis or vibrational monitoring applications of the condition of mechanical elements, require high performances by the MEMS accelerometers; as a result, the aforementioned problems linked to the intrinsic offset of the same MEMS accelerometers may not be acceptable.

A solution that has been proposed to overcome these drawbacks provides for a suitable electronic compensation, for example in the associated ASIC electronic circuit, using a compensation capacitance, of a suitable value, which is coupled in parallel to the sensing capacitances, to obtain at output a compensated signal. However, the working point of the MEMS accelerometer remains affected by the offset intrinsic to the sensing structure, with the resulting previously discussed problems of non-linearity and sensitivity and full-scale value reduction.

BRIEF SUMMARY

Various embodiments of the present disclosure provide a microelectromechanical sensor device, in particular an accelerometer, which allows the previously highlighted problems to be overcome.

According to one embodiment of the present disclosure, a microelectromechanical sensor device includes a substrate; an inertial mass, suspended above the substrate and elastically coupled to a rotor anchoring structure by elastic coupling elements, to perform at least one inertial movement due to a quantity to be sensed; first sensing electrodes, integrally coupled to the inertial mass to be movable due to the inertial movement; and second sensing electrodes, fixed with respect to the quantity to be sensed, facing and capacitively coupled to the first sensing electrodes to form sensing capacitances having a value that is indicative of the quantity to be sensed. The second sensing electrodes are arranged in a suspended manner above the substrate and a compensation structure is configured to move the second sensing electrodes with respect to the first sensing electrodes and vary a facing distance thereof, in the absence of the quantity to be sensed, in order to compensate for a native offset of the sensing structure.

BRIEF DESCRIPTION OF THE SEVERAL VIEWS OF THE DRAWINGS

For a better understanding of the present disclosure, preferred embodiments thereof are now described, purely by way of non-limiting example, with reference to the attached drawings, wherein:

FIGS. 4A and 4B are, respectively, a plan view and a schematic sectional view of a further embodiment of the sensing structure of the microelectromechanical sensor device.

DETAILED DESCRIPTION

As will be described in detail, one aspect of the present solution provides for the introduction, in the sensing structure of a microelectromechanical sensor device, in particular of a MEMS accelerometer having an inertial mass, of stator electrodes which may be moved relative to respective rotor electrodes associated with the inertial mass.

In this manner it is possible to carry out an active offset compensation, moving the stator electrodes, in this case movable and repositionable, so that they are substantially equidistant with respect to the respective rotor electrodes (despite a possible native displacement of the rotor mass, for example due to residual stress of corresponding coupling elastic elements). The position of the same stator electrodes, on the other hand, remains fixed with respect to the quantity to be sensed, in such a way as not to alter the sensing characteristics of the sensor device.

Figure 1:
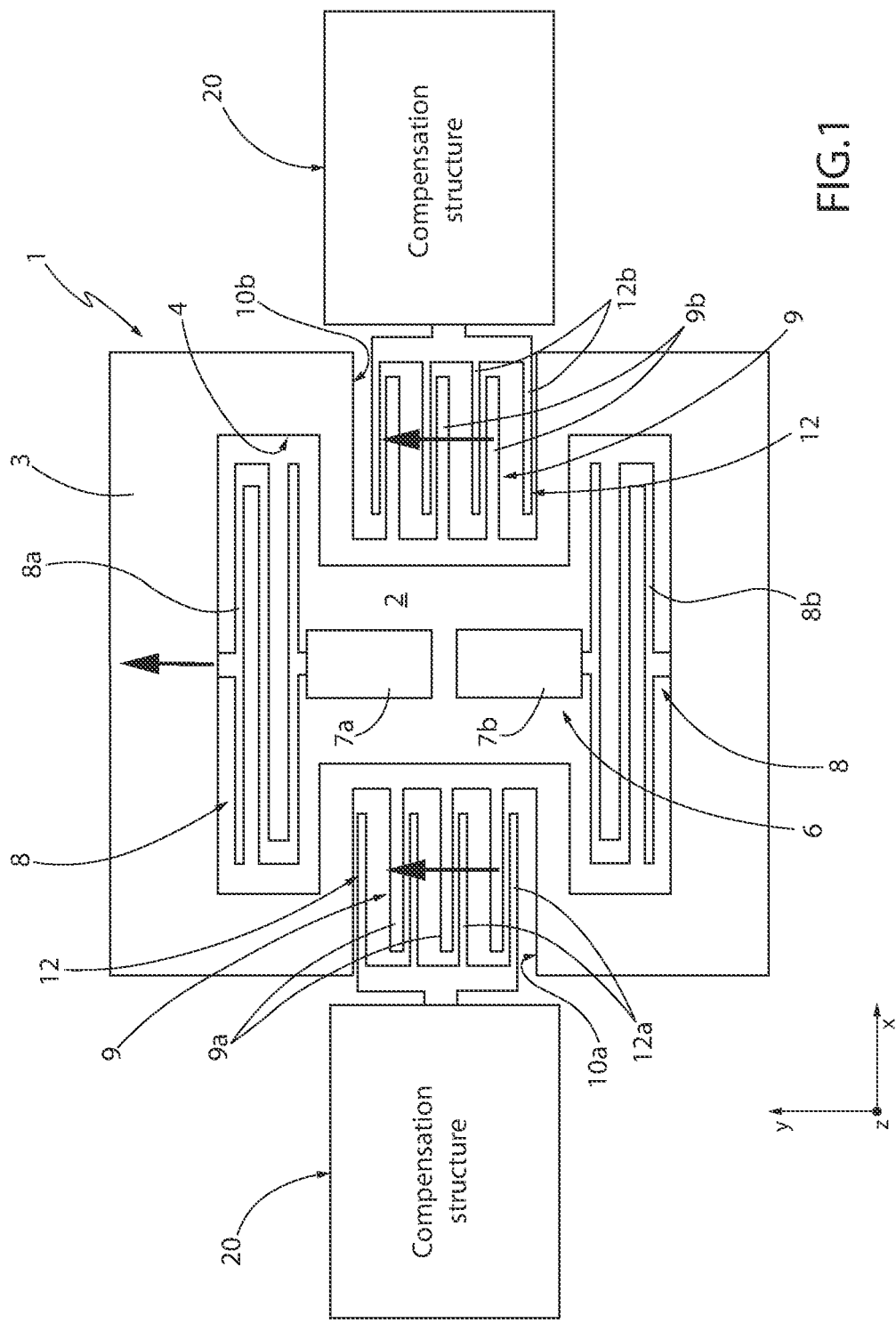
FIG. 1 shows a schematic plan view of a sensing structure of a microelectromechanical sensor device provided with offset compensation, in accordance with the present solution.

FIG. 1 shows a sensing structure 1 of a microelectromechanical sensor device, in particular a MEMS accelerometer with a sensing axis in the horizontal plane, according to an aspect of the present solution.

The sensing structure 1 comprises: a substrate 2 of semiconductor material, for example silicon, having a top surface extending into a horizontal plane xy, defined by a first and a second horizontal axes x, y orthogonal to each other; and an inertial mass 3, formed by conductive material, for example suitably doped epitaxial silicon, and arranged above the substrate 2, suspended at a certain distance from its top surface.

The inertial mass 3 is also customarily referred to as "rotor mass" or simply "rotor", as it is movable due to inertial effect, without this implying, however, that the same inertial mass 3 has a rotational movement; as described below, in this embodiment, the inertial mass 3 has, conversely, a linear movement in response to sensing of an acceleration along a sensing axis.

The inertial mass 3 has a main extension in the horizontal plane xy, parallel to the top surface of the substrate 2, and a substantially negligible dimension along an orthogonal axis z, perpendicular to the aforementioned horizontal plane xy and forming with the first and the second horizontal axes x, y a set of three Cartesian axes xyz. In particular, the second horizontal axis y coincides in this case with the sensing axis of the sensing structure 1.

The inertial mass 3 has the shape of a frame, for example substantially square or rectangular (or, in other words, of a square or rectangular ring), in the aforementioned horizontal plane xy and has centrally a through opening, defining a window 4, traversing it throughout an entire thickness thereof.

The sensing structure 1 further comprises a rotor anchoring structure 6, arranged centrally within the window 4 and integrally coupled to the top surface of the substrate 2. In the illustrated embodiment, this rotor anchoring structure 6 comprises a first and a second rotor anchoring element 7a, 7b, having a substantially rectangular shape in the horizontal plane xy and, in the illustrated example, longitudinal extension along the second horizontal axis y. Each of these first and second rotor anchoring elements 7a, 7b is integrally coupled to the substrate 2 by a coupling portion, which extends for example as a pillar between the top surface of the substrate 2 and the anchoring structure 6.

The inertial mass 3 is elastically coupled to the rotor anchoring structure 6 by elastic coupling elements 8, arranged within the window 4 between the same inertial mass 3 and the rotor anchoring structure 6, on opposite sides of the same rotor anchoring structure 6, in the direction of the second horizontal axis y.

In the illustrated embodiment, a first elastic coupling element 8a, of a folded type, couples the first rotor anchoring element 7a to a first side (e.g., a short side) of the frame of the inertial mass 3; and a second elastic coupling element 8b, also of a folded type, couples the second rotor anchoring element 7b to a second side (opposite to the first side along the second horizontal axis y) of the same frame of the inertial mass 3.

In particular, the elastic coupling elements 8 are configured to allow movement of the inertial mass 3 along the second horizontal axis y with respect to the substrate 2, being yielding to deformations along the same second horizontal axis y (being substantially rigid with respect to deformations along different directions in the horizontal plane xy or transverse to the same horizontal plane xy).

The inertial mass 3 also carries a certain number of rotor electrodes 9, integrally coupled to the same inertial mass 3 (being integral or "monolithic" with this inertial mass 3), in the illustrated embodiment arranged externally to the frame and the corresponding window 4. The aforementioned rotor electrodes 9 have a rectangular shape in the horizontal plane xy and, as well as the inertial mass 3, are suspended above the substrate 2, parallel to the top surface of the same substrate 2.

In detail, in the illustrated embodiment, the aforementioned frame of the inertial mass 3 has centrally, at corresponding sides (e.g., long sides) extending along the second horizontal axis y, a first and a second recesses (or grooves) 10a, 10b.

The aforementioned rotor electrodes 9 comprise a first group of rotor electrodes 9a, which extend longitudinally along the first horizontal axis x within the first recess 10a, starting from the frame of the inertial mass 3; and a second group of rotor electrodes 9b, which extend longitudinally along the first horizontal axis x within the second recess 10b, starting from the frame of the inertial mass 3, in a symmetrical position and specular to the rotor electrodes 9a of the first group with respect to the second horizontal axis y (being aligned with each other along the first horizontal axis x).

The sensing structure 1 also comprises a certain number of stator electrodes 12, facing respective rotor electrodes 9, also having in the example a rectangular shape in the horizontal plane xy elongated along the first horizontal axis x.

According to an aspect of the present solution, these stator electrodes 12 are suspended above the substrate 2, parallel to the top surface of the same substrate 2; in other words, these stator electrodes 12 are not integrally coupled to the substrate 2, but are suspended in a floating manner with respect to the same substrate 2.

A first group of stator electrodes 12a are arranged within the first recess 10a, in a position facing and interdigitated with the rotor electrodes 9a of the first group, in particular being arranged on a first side of the second horizontal axis y with respect to the same rotor electrodes 9a. Correspondingly, a second group of stator electrodes 12b are arranged within the second recess 10b, in a position facing and interdigitated with the rotor electrodes 9b of the second group, in particular being arranged on a second side of the second horizontal axis y (opposite to the aforementioned first side) with respect to the same rotor electrodes 9b.

Essentially, a displacement of the inertial mass 3 along the second horizontal axis y causes a relative movement of the rotor electrodes 9a away from the stator electrodes 12a of the first group (and a corresponding decrease of a first sensing capacitance formed between the same electrodes); and a corresponding relative movement of the rotor electrodes 9b towards the stator electrodes 12b of the second group (and a corresponding increase of a second sensing capacitance formed between the same electrodes).

Ideally, in the absence of an external acceleration to be sensed (in the example, along the second horizontal axis y), the rotor electrodes 9a and the stator electrodes 12a of the first group have a facing distance from each other which is equal to a respective facing distance between the rotor electrodes 9b and the stator electrodes 12b of the second group (essentially, the rotor electrodes 9 are equidistant from the stator electrodes 12). The facing distance is, for example, a distance between a surface of the a rotor electrode 9a and a surface of a stator electrode 12a (which is capacitively coupled to the rotor electrode 9a) that faces the surface of the rotor electrode 9a. In one embodiment, the facing distance between each of the rotor electrodes 9a and the stator electrodes 12a are the same.

However, as previously indicated, the inertial mass 3 may have, for example due to the presence of different residual stresses in the elastic coupling elements 8a, 8b, a native (undesired) displacement along the second axis y in a rest condition (e.g., in the direction indicated by the arrow in FIG. 1), causing a mismatch between the aforementioned facing distances between the rotor electrodes 9a and the stator electrodes 12a of the first group and between the rotor electrodes 9b and the stator electrodes 12b of the second group.

Essentially, an initial variation occurs, in the rest condition, between the aforementioned first and second sensing capacitances with a resulting offset in the output signal; this offset is intrinsic or native to the sensing structure 1.

According to an aspect of the present solution, the sensing structure 1 therefore comprises a compensation structure 20 (schematically shown in FIG. 1) coupled to the stator electrodes 12 and configured to cause a suitable displacement thereof, in the example along the second horizontal axis y, in order to compensate for the aforementioned undesired initial displacement of the inertial mass 3 and, therefore, compensate the offset of the output signal.

In other words, the compensation structure 20 is operable to restore a situation of equidistance in the facing between the rotor electrodes 9a and the stator electrodes 12a of the first group and between the rotor electrodes 9b and the stator electrodes 12b of the second group.

As will be discussed below, the compensation structure 20 is coupled to the stator electrodes 12 in such a way that the same stator electrodes 12 are insensitive to the acceleration to be sensed (in the example the linear acceleration along the second horizontal axis y), thus behaving effectively as "fixed" or reference electrodes with respect to the rotor electrodes 9, for sensing the same acceleration.

Figure 2:
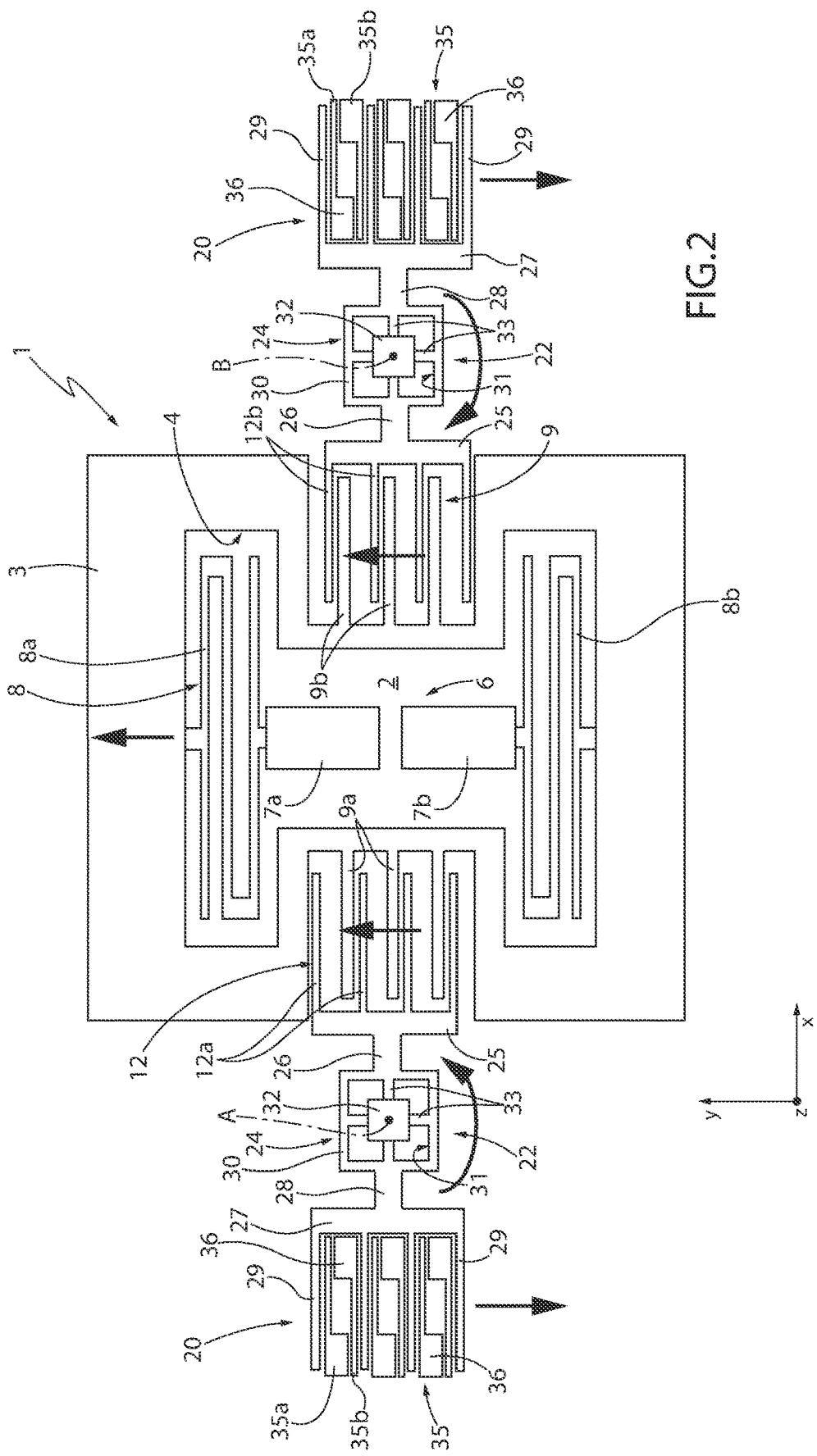
FIG. 2 is a plan view of a possible embodiment of the sensing structure.

In detail, and with reference to FIG. 2, a possible embodiment of the aforementioned compensation structure 20 is now described.

In this embodiment, the compensation structure 20 provides, for each group of stator electrodes 12a, 12b, a respective actuation structure 22, with pivoting movement about a respective rotation axis A, B parallel to the orthogonal axis z, which comprises: a central pivot element 24, anchored to the substrate 2; a first arm 25, coupled to the central pivot element 24 on a first side with respect to the first horizontal axis x by a rigid connection element 26 and carrying the stator electrodes 12a, 12b of the respective first or second group; and a second arm 27, coupled to the central pivot element 24 by a respective rigid connection element 28 on a second side with respect to the first horizontal axis x, opposite to the first side, and carrying respective movable actuation electrodes 29.

In the example illustrated in FIG. 2, the aforementioned first and second arms 25, 26 have a substantially rectangular shape in the horizontal plane xy, with extension along the second horizontal axis y and carry the respective stator electrodes 12a, 12b, respectively movable actuation electrodes 29, at a side opposite to the central pivot element 24 with respect to the first horizontal axis x, with a rake- or fork-like arrangement.

The aforementioned central pivot element 24, in the illustrated embodiment, comprises a frame 30, substantially square in the horizontal plane xy, suspended above the substrate 2 and internally defining a window 31; the frame 30 is coupled to a central anchor 32, arranged centrally to the window 31 at the respective rotation axis A, B and integral with the substrate 2 (having for example a substantially vertical pillar shape).

In particular, the frame 30 is elastically coupled to the central anchor 32 by four coupling elastic elements 33, arranged as a cross with respect to the aforementioned central anchor 32 and aligned in pairs along the first or second horizontal axes x, y; these coupling elastic elements 33 are yielding to bending in the horizontal plane xy, allowing the rotation of the frame 30 about the central anchor 32 and the respective rotation axis A, B.

The compensation structure 20 also comprises fixed actuation electrodes 35, arranged in an interdigitated manner with the movable actuation electrodes 29 of a respective actuation structure 22 and anchored to the substrate 2 by a respective anchoring portion 36 (having for example a vertical columnar shape).

In the embodiment of FIG. 2, the aforementioned fixed actuation electrodes 35 comprise first and second fixed actuation electrodes 35a, 35b, designed to be biased at a different biasing voltage, arranged on opposite sides of a respective movable actuation electrode 29 with respect to the second horizontal axis y.

During operation, a suitable biasing of the fixed actuation electrodes 35 with respect to the actuation structure 22 (which may be set to a reference voltage, for example about half of the dynamics of a corresponding reading electronics, for example about 0.75 V–1 V) causes the displacement of the movable actuation electrodes 29 of the respective actuation structure 22 (e.g., in the direction of the second horizontal axis y, as indicated by the arrow in the same FIG. 2), the resulting rotation of the central pivot element 24 about the central anchor 32 and the respective rotation axis A, B and the displacement (in the opposite directions of the same second horizontal axis y, again as indicated by the arrow in the same FIG. 2) of the stator electrodes 12a, 12b of the respective first or second group.

This displacement of the stator electrodes 12a, 12b allows the desired mechanical offset compensation, canceling the effect of the native displacement of the inertial mass 3 and the associated capacitive mismatch between stator electrodes 12 and respective rotor electrodes 9.

An offset compensation procedure may therefore be implemented which may provide, in the absence of external acceleration stimuli, for a process, for example an iterative process, of applying a suitable biasing voltage to the fixed actuation electrodes 35 of the compensation structure 20 for the resulting repositioning of the stator electrodes 12 with respect to the rotor electrodes 9, until an offset-free output signal is obtained.

This offset compensation procedure may be performed at a first use of the MEMS accelerometer or at the start-up of the same MEMS accelerometer or, in any case, when it is deemed suitable (e.g., following the determination of an offset on the output signal greater than a certain threshold). Typically, the offset compensation procedure may be performed during a calibration executed at the end of the manufacturing process or after mounting on a printed circuit.

In a possible implementation, the aforementioned offset compensation procedure may be implemented by the ASIC electronic circuit of the MEMS accelerometer, or internally to the same MEMS accelerometer; alternatively, this procedure may be implemented externally to the MEMS accelerometer, for example by a control unit of an electronic device wherein the same MEMS accelerometer is used (in this case, this control unit providing suitable control and/or biasing signals to the MEMS accelerometer).

Advantageously, the aforementioned compensation structure 20 is insensitive to the external acceleration that is to be sensed by the sensing structure 1; in other words, in the example, the aforementioned compensation structure 20 is capable of rejecting the linear acceleration along the second horizontal axis y.

In particular, the aforementioned actuation structure 22, being balanced with respect to the central pivot element 24, does not move in the presence of a linear acceleration, acting along the second horizontal axis y; this acceleration in fact acts in a corresponding manner on the stator electrodes 12 and on the movable actuation electrodes 29, on the opposite sides of the same central pivot element 24, which therefore does not move and does not rotate about the central anchor 32.

Figure 3:
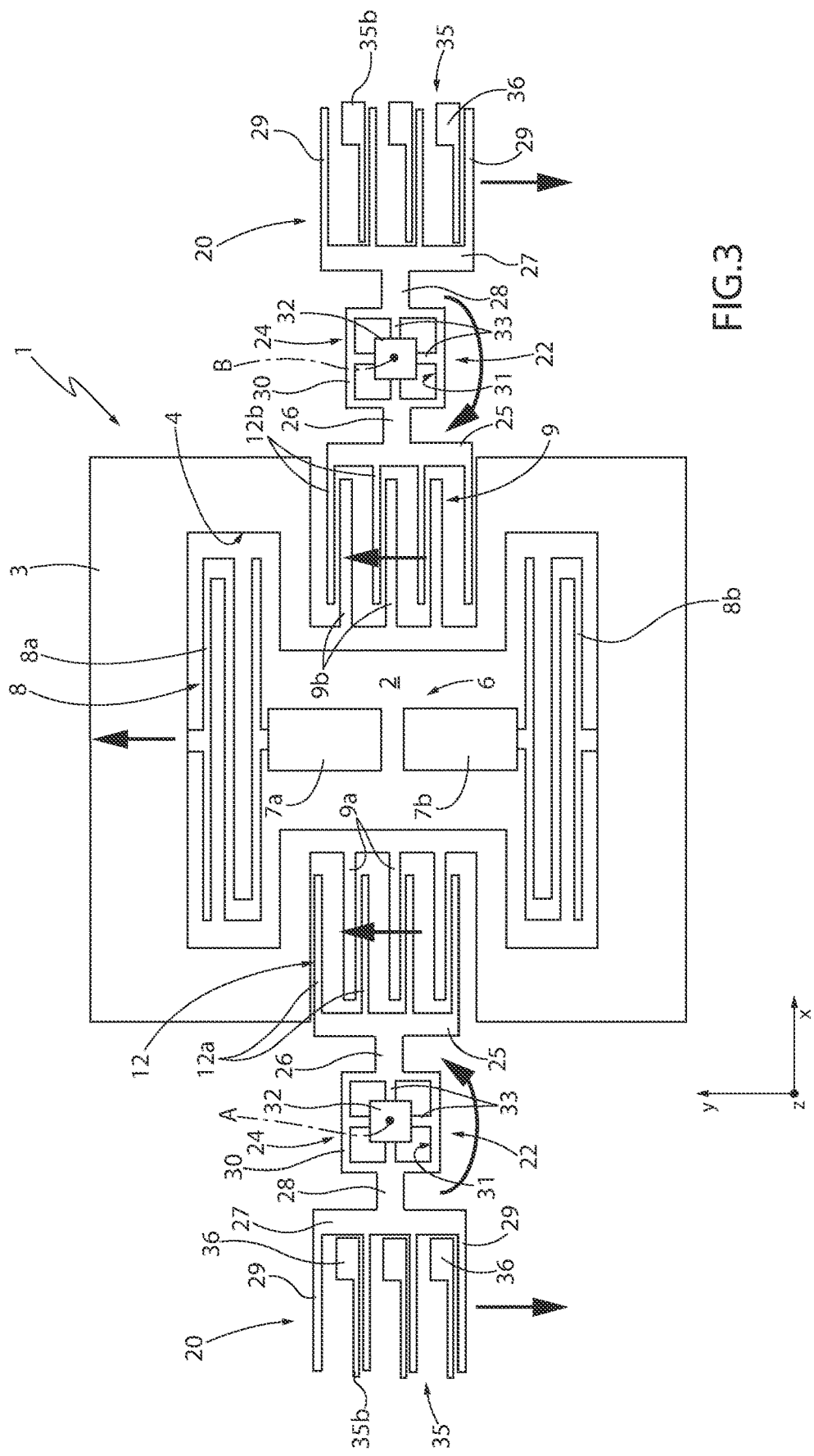
FIG. 3 is a plan view of a variant embodiment of the sensing structure.

FIG. 3 shows a variant embodiment of the compensation structure 20 of the sensing structure 1 (generally having the same configuration shown in FIG. 2).

In this variant, the fixed actuation electrodes 35 of the compensation structure 20 comprise the first fixed actuation electrodes 35a without the second fixed actuation electrodes 35b (or, similarly and in a manner illustrated in this FIG. 3, the second fixed actuation electrodes 35b without the first fixed actuation electrodes 35a).

As previously illustrated, also in this embodiment the biasing of the fixed actuation electrodes 35 allows the offset to be compensated, in particular by compensating for the initial displacement of the inertial mass 3 due to the intrinsic or native offset.

However, since in this case it would be possible to move the stator electrodes 12 in only one direction of the second horizontal axis y (given the presence of only the first, or second, fixed actuation electrodes 35a, 35b), a specific biasing strategy of the same fixed actuation electrodes 35 is implemented.

In detail, the position of the fixed actuation electrodes 35 with respect to the movable actuation electrodes 29 is set (by a specific shape of the photolithographic masks during the formation of the compensation structure 20) in such a way that, in the absence of external stimuli, the offset compensation occurs with a biasing voltage roughly corresponding to half of the biasing dynamics (for example, roughly about 5 V, in case the output dynamics is comprised between 0 and 10 V).

Using this particular biasing strategy, the two halves of the dynamics of the biasing voltage may be used to move the movable compensation electrodes 29 in opposite directions of the second horizontal axis y to compensate for displacements of the inertial mass 3 in both the aforementioned directions.

With reference to FIGS. 4A and 4B, a further embodiment of the sensing structure 1 is now described, in this case for providing a MEMS accelerometer with an out-of-plane sensing axis (z axis).

As will be described in greater detail, in a manner similar to what has been previously described, the compensation structure 20 is again provided, configured to mechanically compensate for native displacements of the inertial mass 3 and, therefore, to compensate the offset of the output signal.

In detail, the inertial mass 3 is in this case coupled to the rotor anchoring structure 6 coupled to the substrate 2, arranged centrally within the window 4, by elastic coupling elements 8a, 8b, yielding to torsion about a rotation axis parallel to the second horizontal axis y and defined by their longitudinal extension.

The same inertial mass 3 has an asymmetrical mass distribution with respect to this rotation axis, in such a way as to be set to rotation due to inertial effect in response to an acceleration to be sensed along the orthogonal axis z.

The rotor electrodes 9, integrally coupled to the same inertial mass 3, comprise in this case a first and a second rotor electrode 9a, 9b arranged on opposite sides with respect to the rotation axis and the rotor anchoring structure 6, in a suspended manner above the substrate 2. The first and second rotor electrodes 9a, 9b have a substantially rectangular shape in the horizontal plane xy, are arranged centrally with respect to the window 4 and are coupled to the frame of the inertial mass 3 by respective rigid connection elements 38 extending parallel to the second horizontal axis y, on opposite sides with respect to the respective rotor electrode 9a, 9b.

In this embodiment, the stator electrodes 12 are suspended again in a floating manner with respect to the substrate 2 (decoupled from the same substrate 2), being in this case arranged in the window 4, partially above the rotor electrodes 9. As best shown in FIG. 4A, the window 4 may include three separate portions in which the rotor anchoring structure 6 is positioned within a first portion, the rotor electrode 9a is in a second portion, and the rotor electrode 9b is in a third portion.

These stator electrodes 12 comprise herein a first stator electrode 12a, suspended above the first rotor electrode 9a; and a second stator electrode 12b, suspended above the second rotor electrode 9b. The aforementioned stator electrodes 12 have a substantially rectangular shape in the horizontal plane xy, with a greater extension with respect to the rotor electrodes 9. In particular, these stator electrodes 12a, 12b have an overlap portion superimposed on the respective rotor electrode 9a, 9b only at a first half, closer to the rotation axis of the inertial mass 3.

According to an aspect of the present solution, as shown schematically in FIG. 4B, in this case the actuation structure 22 of the compensation structure 20 is configured to constrain the same stator electrodes 12 in a pivoting manner about a respective constraint or central pivot element 24, arranged centrally with respect to their extension in the horizontal plane xy and anchored to the substrate 2, and about a respective rotation axis A, B.

In this case, the compensation structure 20 comprises fixed actuation electrodes 35, arranged within the window 4, below the stator electrodes 12. In particular, these fixed actuation electrodes comprise, for each stator electrode 12, a pair of first and second fixed actuation electrodes 35a, 35b, arranged on opposite sides of the respective rotation axis A, B, below respective end portions of the respective stator electrode 12 and designed to be biased at a different biasing voltage.

During operation, the acceleration to be sensed along the orthogonal axis z causes a rotation of the inertial mass 3 and a differential variation of the sensing capacitances between the first rotor electrode 9a and the first stator electrode 12a and between the second rotor electrode 9b and the second stator electrode 12b.

During an offset compensation procedure, a suitable biasing of the fixed actuation electrodes 35 causes the rotation of the same stator electrodes 12 about the respective rotation axis A, B and a resulting variation of the facing distance with respect to the movable electrodes 9 and of the corresponding sensing capacitance.

Advantageously, also in this case, it is thus possible to compensate for the undesired displacement of the inertial mass 3 due, for example, to residual stresses in the elastic coupling elements 8, and, therefore, to compensate the offset of the output signal.

Also in this case, the compensation structure 20 is insensitive to the acceleration to be sensed. In particular, given the symmetrical and balanced configuration with respect to the respective central constraint and the respective rotation axis A, B, the fixed electrodes 12 do not move in the presence of an acceleration to be sensed along the orthogonal axis z, thus not altering the sensing characteristics of the same acceleration.

The aforementioned sensing structure 1 may be advantageously formed using known processes of surface micromachining of semiconductor materials, for example by using the so-called double ThELMA (Thick Epipoly Layer for Microactuators and Accelerometers) process.

In general, the ThELMA process allows providing suspended structures with relatively small thickness (e.g., of the order of 20-30 μm), anchored to a substrate through yielding parts (springs) and therefore capable of moving, for example due to inertial effect, with respect to the underlying silicon substrate. The process consists in different production steps, including:

thermal oxidation of the substrate;
deposition and patterning of horizontal electrical interconnections;
deposition and patterning of a sacrificial layer, in particular of silicon oxide;
epitaxial growth of a first structural layer (e.g., made of polysilicon, designed for the formation of suspended masses);
patterning of the structural layer by trench etching;
removal of the sacrificial oxide for the release of the various suspended masses; and
deposition of contact metallizations.

In particular, for providing the sensing structure 1, a double ThELMA process may be conveniently carried out, with the epitaxial growth of a further structural layer above the first structural layer provided epitaxially on the substrate.

In this case, the aforementioned stator electrodes 12 may be formed in the aforementioned further structural layer, suspended above the movable electrodes 9, the latter being formed in the first structural layer.

The advantages of the present solution are clear from the previous description.

In any case, it is again underlined that the compensation structure 20 allows the non-linearity problems and the full-scale limitations associated with the intrinsic or natural offset to be solved, internally to the sensing structure 1 of the MEMS accelerometer (in particular, without requiring the presence of external electronics).

Furthermore, advantageously, this compensation structure 20 does not alter the motion, the equilibrium and stability of the same sensing structure 1.

In this regard, it is highlighted that the fact that the actuation electrodes of the aforementioned compensation structure 20 do not face directly the inertial mass 3 avoids problems linked to possible electric fields due to electrostatic actuation (such as pull-in effects or changes in sensitivity or stability).

Finally, it is clear that modifications and variations may be made to what has been described and illustrated without thereby departing from the scope of the present disclosure.

In particular, it is underlined that a different solution to make the compensation structure 20 insensitive to the external acceleration that is to be sensed by the sensing structure 1 may provide for designing the same compensation structure 20 with a resonance frequency much higher than that of the same sensing structure 1 (e.g., equal to 30 kHz, against 3 kHz of the sensing structure 1).

Furthermore, the number and the arrangement of the actuation electrodes of the compensation structure 20 might differ from what has been illustrated. For example, a variant embodiment might envisage the aforementioned actuation structure 22 and the associated actuation electrodes for one of stator electrodes 12a, 12b (instead of both).

A microelectromechanical sensor device having a sensing structure (1) may be summarized as including a substrate (2); an inertial mass (3), suspended above the substrate (2) and elastically coupled to an anchoring structure (6) by elastic coupling elements (8), so as to perform at least one inertial movement due to a quantity to be sensed; first sensing electrodes (9), integrally coupled to the inertial mass (3) to be movable due to said inertial movement; and second sensing electrodes (12), fixed with respect to said quantity to be sensed, facing and capacitively coupled to the first sensing electrodes (9) to form sensing capacitances having a value indicative of the quantity to be sensed, characterized in that said second sensing electrodes (12) are arranged in a suspended manner above the substrate (2) and by including a compensation structure (20) configured to move said second sensing electrodes (12) with respect to said first sensing electrodes (9) and vary a facing distance thereof, in the absence of said quantity to be sensed, in order to compensate for an offset of said sensing structure (1).

The offset may be due to a native displacement of said inertial mass (3) in the absence of said quantity to be sensed, due to a residual stress in said elastic coupling elements (8); and the compensation structure (20) may be configured to move said second sensing electrodes (12) with respect to said first sensing electrodes (9) to compensate for said native displacement.

The compensation structure (20) may be configured to be insensitive with respect to said quantity to be sensed.

The compensation structure (20) may include at least one actuation structure (22) integrally coupled to respective ones of said second sensing electrodes (12); and fixed actuation electrodes (35) configured to be biased to cause the rotation of said actuation structure (22) about a central constraint and the consequent displacement of said second sensing electrodes (12), said actuation structure (22) having a balanced configuration with respect to said central constraint.

The inertial mass (3) may have a main extension in a horizontal plane (xy); and the actuation structure (22) may include: a pivot element (24), anchored to the substrate (2) and defining said central constraint; a first arm (25), coupled to the pivot element (24) on a first side with respect to a first horizontal axis (x) of said horizontal plane (xy) and carrying the respective ones of said second sensing electrodes (12); and a second arm (27), coupled to the pivot element (24) on a second side with respect to the first horizontal axis (x), opposite to the first side, and carrying respective movable actuation electrodes (29), capacitively coupled to said fixed actuation electrodes (35).

The pivot element (24) may include a frame (30), suspended above the substrate (2) and internally defining a window (31); the frame (30) being coupled to a central anchor (32), arranged centrally to the window (31) and integral with the substrate (2), by coupling elastic elements (33), arranged as a cross with respect to said central anchor (32) and yielding to bending in the horizontal plane (xy), to allow the rotation of the frame (30) about the central anchor (32).

The inertial mass (3) may have a frame shape in the horizontal plane (xy), internally defining a window (4), in which said rotor anchoring structure (6) and said elastic coupling elements (8) are arranged; and the first sensing electrodes (9) are integrally coupled to said inertial mass (3) externally with respect to said frame and said second sensing electrodes (12) are arranged facing and interdigitated to said first sensing electrodes (9).

The first sensing electrodes (9) may include a first group of electrodes (9a), which extend longitudinally along the first horizontal axis (x) within a first recess (10a) defined in said frame of the inertial mass (3); and a second group of electrodes (9b), which extend longitudinally along the first horizontal axis (x) within a second recess (10b), defined in said frame of the inertial mass (3), in symmetrical position with respect to a second horizontal axis (y) of said horizontal plane (xy), orthogonal to said first horizontal axis (x); the second sensing electrodes (12) may include a respective first group of electrodes (12a) facing and interdigitated to the first group of electrodes of the first sensing electrodes (9) and a respective second group of electrodes (12b) facing and interdigitated to the second group of electrodes of the second sensing electrodes (12); said compensation structure (20) including a respective actuation structure (22), for each of said first and second group of second sensing electrodes (12).

The fixed actuation electrodes (35) may include first and second fixed actuation electrodes (35a, 35b), configured to be biased to a different biasing voltage, arranged on opposite sides of a respective movable actuation electrode (29) with respect to a second horizontal axis (y) of said horizontal plane (xy), orthogonal to said first horizontal axis (x).

The fixed actuation electrodes (35) may be arranged on a same side of respective movable actuation electrodes (29) with respect to a second horizontal axis (y) of said horizontal plane (xy), orthogonal to said first horizontal axis (x); and the position of the fixed actuation electrodes (35) with respect to the movable actuation electrodes (29) is set in such a way that, in the absence of said quantity to be sensed, the offset compensation occurs with a biasing voltage corresponding to half of a useful biasing dynamics.

The device may define an accelerometer with a sensing axis parallel to a second horizontal axis (y) of said horizontal plane (xy), orthogonal to said first horizontal axis (x).

The inertial mass (3) may have a frame shape in the horizontal plane (xy), internally defining a window (4), in which said rotor anchoring structure (6) and said elastic coupling elements (8) are arranged; and the elastic coupling elements (8) are yielding to torsion about a rotation axis parallel to a second horizontal axis (y) of said horizontal plane (xy), orthogonal to said first horizontal axis (x), and said inertial movement is a rotation about said rotation axis of the inertial mass (3), having an asymmetrical mass distribution with respect to said rotation axis; said first sensing electrodes (9) may include a first and a second electrode (9a, 9b) arranged on opposite sides with respect to the rotation axis, integrally coupled internally to the frame of the inertial mass (3) and said second sensing electrodes (12) include a respective first and second electrode (12a, 12b), partially suspended above the first, respectively second, electrode of said first sensing electrodes (9).

The second sensing electrodes (12) may be superimposed on the respective first sensing electrode (9) at a corresponding first half thereof, closer to the rotation axis of the inertial mass (3); and the actuation structure (22) of the compensation structure (20) may be configured to constrain said second sensing electrodes (12) in a pivoting manner with respect to a respective rotation axis (A, B) arranged centrally with respect to their extension in the horizontal plane (xy).

The compensation structure (20) may include fixed actuation electrodes (35), arranged within the window (4), below a respective one of the second stator electrodes (12); said fixed actuation electrodes (35) including, for each of said second sensing electrodes (12), a pair of first and second fixed actuation electrodes (35a, 35b), arranged on opposite sides of the respective rotation axis (A, B), below respective end portions of the respective one of said second sensing electrodes (12).

The device may define an accelerometer with a sensing axis parallel to an orthogonal axis (z), transverse to said horizontal plane (xy).

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A microelectromechanical sensor device, comprising:
a substrate;
an inertial mass suspended above the substrate and elastically coupled to an anchoring structure by elastic coupling elements, the inertial mass configured to perform at least one inertial movement due to a quantity to be sensed;
first sensing electrodes integrally coupled to the inertial mass to be movable due to the inertial movement;
second sensing electrodes fixed with respect to the quantity to be sensed, the second sensing electrodes facing and capacitively coupled to the first sensing electrodes to form sensing capacitances having a value indicative of the quantity to be sensed, the second sensing electrodes being arranged in a suspended manner above the substrate; and
a compensation structure configured to move the second sensing electrodes with respect to the first sensing electrodes, and vary facing distances between the second sensing electrodes and the first sensing electrodes, in the absence of the quantity to be sensed, in order to compensate for an offset of the microelectromechanical sensor device.

2. The microelectromechanical sensor device according to claim 1,
wherein the offset is due to a native displacement of the inertial mass in the absence of the quantity to be sensed caused by a residual stress in the elastic coupling elements; and
wherein the compensation structure is configured to move the second sensing electrodes with respect to the first sensing electrodes to compensate for the native displacement.

3. The microelectromechanical sensor device according to claim 1, wherein the compensation structure is configured to be insensitive with respect to the quantity to be sensed.

4. The microelectromechanical sensor device according to claim 3, wherein the compensation structure includes:
at least one actuation structure integrally coupled to respective ones of the second sensing electrodes; and
fixed actuation electrodes configured to be biased to cause a rotation of the actuation structure about a central constraint and a consequent displacement of the second sensing electrodes, the actuation structure having a balanced configuration with respect to the central constraint.

5. The microelectromechanical sensor device according to claim 4,
wherein the inertial mass has a main extension in a horizontal plane; and
wherein the actuation structure includes:
a pivot element anchored to the substrate and defining the central constraint;
a first arm coupled to the pivot element on a first side of the actuation structure with respect to a first horizontal axis of the horizontal plane, and coupled to the respective ones of the second sensing electrodes; and
a second arm coupled to the pivot element on a second side of the actuation structure with respect to the first horizontal axis, opposite to the first side, and coupled to respective movable actuation electrodes capacitively coupled to the fixed actuation electrodes.

6. The microelectromechanical sensor device according to claim 5, wherein the pivot element includes:
a frame suspended above the substrate and internally defining a window; and
a central anchor arranged centrally to the window and integral with the substrate, the frame being coupled to the central anchor by coupling elastic elements arranged as a cross with respect to the central anchor and yielding to bending in the horizontal plane to allow the rotation of the frame about the central anchor.

7. The microelectromechanical sensor device according to claim 5,
wherein the inertial mass has a frame in the horizontal plane, the frame internally defining a window in which the anchoring structure and the elastic coupling elements are arranged;
wherein the first sensing electrodes are integrally coupled to the inertial mass externally with respect to the frame, and the second sensing electrodes are arranged facing and interdigitated to the first sensing electrodes.

8. The microelectromechanical sensor device according to claim 7,
wherein the first sensing electrodes includes:
a first group of electrodes, which extend longitudinally along the first horizontal axis within a first recess defined in the frame of the inertial mass; and
a second group of electrodes, which extend longitudinally along the first horizontal axis within a second recess defined in the frame of the inertial mass the second group of electrodes being in a symmetrical position to the first group of electrodes with respect to a second horizontal axis of the horizontal plane, the second horizontal axis being orthogonal to the first horizontal axis;
wherein the second sensing electrodes includes:
a respective first group of electrodes facing and interdigitated to the first group of electrodes of the first sensing electrodes; and
a respective second group of electrodes facing and interdigitated to the second group of electrodes of the second sensing electrodes; and
wherein the compensation structure includes a respective actuation structure for each of the respective first group of electrodes and the respective second group of electrodes.

9. The microelectromechanical sensor device according to claim 5, wherein the fixed actuation electrodes includes:
first and second fixed actuation electrodes configured to be biased to a different biasing voltage, the first and second fixed actuation electrodes being arranged on opposite sides of a respective movable actuation electrode with respect to a second horizontal axis of the horizontal plane, orthogonal to the first horizontal axis.

10. The microelectromechanical sensor device according to claim 5,
wherein the fixed actuation electrodes are arranged on a same side of respective movable actuation electrodes with respect to a second horizontal axis of the horizontal plane, orthogonal to the first horizontal axis; and wherein positions of the fixed actuation electrodes with respect to the movable actuation electrodes is set in such a way that, in the absence of the quantity to be sensed, the offset compensation occurs with a biasing voltage corresponding to half of a useful biasing dynamic.

11. The microelectromechanical sensor device according to claim 5, wherein the microelectromechanical sensor device is an accelerometer with a sensing axis parallel to a second horizontal axis of the horizontal plane, orthogonal to the first horizontal axis.

12. The microelectromechanical sensor device according to claim 4,
wherein the inertial mass has a frame in a horizontal plane, the frame internally defining a window, in which the anchoring structure and the elastic coupling elements are arranged; and
wherein the elastic coupling elements are configured to yield to torsion about a rotation axis parallel to a second horizontal axis of the horizontal plane, orthogonal to a first horizontal axis;
wherein the inertial movement is a rotation about the rotation axis, the inertial mass having an asymmetrical mass distribution with respect to the rotation axis;
wherein the first sensing electrodes includes a first and a second electrode arranged on opposite sides with respect to the rotation axis, the first and the second electrode being integrally coupled internally to the frame of the inertial mass; and
wherein the second sensing electrodes includes a respective first and second electrode, partially suspended above the first and the second electrode, respectively, of the first sensing electrodes.

13. The microelectromechanical sensor device according to claim 12,
wherein the second sensing electrodes are respectively superimposed over the first sensing electrodes at corresponding portions of the first sensing electrode, closer to the rotation axis; and
wherein the actuation structure of the compensation structure is configured to constrain the second sensing electrodes in a pivoting manner with respect to a respective rotation axis arranged centrally with respect to their extension in the horizontal plane.

14. The microelectromechanical sensor device according to claim 13,
wherein the compensation structure includes fixed actuation electrodes arranged within the window and below the second sensing electrodes, respectively;
wherein the fixed actuation electrodes includes, for each of the second sensing electrodes, a pair of first and second fixed actuation electrodes, arranged on opposite sides of the respective rotation axis and below respective end portions of the second sensing electrodes.

15. The microelectromechanical sensor device according to claim 12, wherein the microelectromechanical sensor device is an accelerometer with a sensing axis parallel to an orthogonal axis transverse to the horizontal plane.

16. A device, comprising:
a substrate having a surface;
a mass suspended over the surface of the substrate, the mass configured to move in a first direction;
a first plurality of electrodes coupled to a first side of the mass, and extending in a second direction transverse to the first direction;
a second plurality of electrodes coupled to a second side, opposite to the first side, of the mass, and extending in the second direction;
a first compensation structure positioned at the first side of the mass, the first compensation structure includes a first actuation structure configured to rotate around a first axis extending in a third direction transverse to the first and second directions;
a third plurality of electrodes coupled to the first compensation structure, and extending in the second direction, at least one of the third plurality of electrodes being positioned between two of the first plurality of electrodes, the first compensation structure configured to move the third plurality of electrodes in the first direction;
a second compensation structure positioned at the second side of the mass, the second compensation structure includes a second actuation structure configured to rotate around a second axis extending in the third direction; and
a fourth plurality of electrodes coupled to the second compensation structure, and extending in the second direction, at least one of the fourth plurality of electrodes being positioned between two of the second plurality of electrodes, the second compensation structure configured to move the fourth plurality of electrodes in the first direction.

17. The device of claim 16, further comprising:
a first anchoring element positioned in a window of the mass and coupled to the substrate; and
a second anchoring element positioned in a window of the mass and coupled to the substrate, the mass being elastically coupled to the first and second anchoring elements.

18. A device, comprising:
a substrate;
an anchoring structure coupled to the substrate;
a mass elastically coupled to the anchoring structure and suspended over a surface of the substrate, the mass configured to rotate around a first axis extending parallel to the surface of the substrate;
a first electrode coupled to a first side of the mass;
a second electrode coupled to a second side, opposite to the first side, of the mass;
a first compensation structure positioned at the first side of the mass;
a third electrode suspended over at least a portion of the first electrode, the first compensation structure configured to rotate the third electrode around a second axis parallel to the first axis;
a second compensation structure positioned at the second side of the mass;
a fourth electrode suspended over at least a portion of the second electrode, the second compensation structure configured to rotate the fourth electrode around a third axis parallel to the first axis.

19. The device of claim 18, wherein
the first compensation structure includes a first plurality of electrodes on the substrate and underlying the third electrode, and
the second compensation structure includes a second plurality of electrodes on the substrate and underlying the fourth electrode.

* * * * *